(12) United States Patent
Kang et al.

(10) Patent No.: US 7,605,994 B2
(45) Date of Patent: Oct. 20, 2009

(54) MULTIPLE SINUSOIDAL SEEK SERVO SYSTEM FOR REDUCING SEEK ACOUSTICS AND SEEK TIME IN HARD DISK DRIVES

(75) Inventors: Chang-Ik Kang, Fremont, CA (US);
Young-Hoon Kim, Cupertino, CA (US);
Sang-Hoon Chu, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/528,960

(22) Filed: Sep. 27, 2006

(65) Prior Publication Data
US 2008/0106817 A1 May 8, 2008

(51) Int. Cl.
*G11B 21/04* (2006.01)
(52) U.S. Cl. .......................................... 360/70
(58) Field of Classification Search ........... 360/70, 360/69, 77.04, 77.02, 77.03, 78.06; 318/254; 702/64
See application file for complete search history.

(56) References Cited

U.S. PATENT DOCUMENTS

| | | | | |
|---|---|---|---|---|
| 5,299,149 A * | 3/1994 | Morita et al. | | 702/64 |
| 6,563,663 B1 * | 5/2003 | Bi et al. | | 360/77.04 |
| 6,618,218 B1 * | 9/2003 | Kadowaki et al. | | 360/77.03 |
| 6,825,622 B1 * | 11/2004 | Ryan et al. | | 318/254 |
| 7,088,546 B2 * | 8/2006 | Ehrlich | | 360/77.02 |
| 7,088,547 B1 * | 8/2006 | Wang et al. | | 360/77.04 |
| 7,265,931 B2 * | 9/2007 | Ehrlich | | 360/77.02 |
| 7,265,933 B1 * | 9/2007 | Phan et al. | | 360/77.04 |
| 7,304,817 B1 * | 12/2007 | Kang et al. | | 360/69 |
| 7,315,432 B2 * | 1/2008 | Lee | | 360/78.06 |
| 2004/0257693 A1 * | 12/2004 | Ehrlich | | 360/77.02 |
| 2006/0066986 A1 * | 3/2006 | Shih | | 360/78.06 |
| 2006/0077588 A1 * | 4/2006 | Shih | | 360/78.06 |
| 2006/0082922 A1 * | 4/2006 | Shih | | 360/78.06 |
| 2006/0158772 A1 * | 7/2006 | Lee et al. | | 360/78.04 |

* cited by examiner

*Primary Examiner*—Fred Tzeng
(74) *Attorney, Agent, or Firm*—Ben J. Yorks; Irell & Manella LLP (57) ABSTRACT

A hard disk drive that includes a voice coil motor controlled by a servo. The servo provides a driving signal that has multiple sinusoidal waveforms. The multi-sinusoidal waveforms minimize seek time and vibrations in the drive.

11 Claims, 5 Drawing Sheets

MULTIPLE SINUSOIDAL SEEK SERVO SYSTEM FOR REDUCING SEEK ACOUSTICS AND SEEK TIME IN HARD DISK DRIVES

BACKGROUND OF THE INVENTION

1. Field of the Invention

The present invention relates to a servo routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

Figure 1:
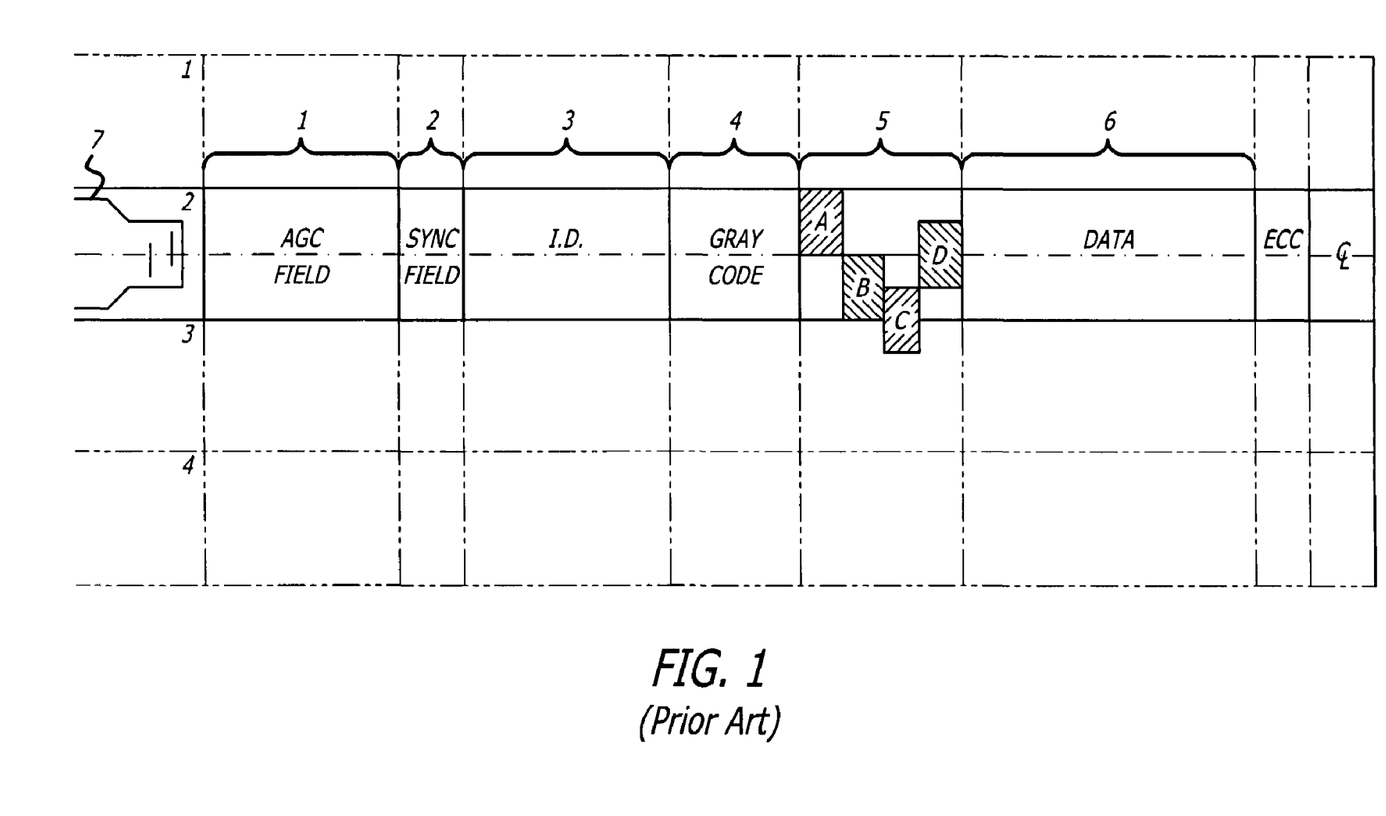
FIG. 1 is an illustration of a track of the prior art.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A−B)−(C−D)) to create a position error signal ("PES"). The PES is used to create a drive signal for the voice coil motor to position the head on the track.

The drive can enter a seek routine to access data at different disk tracks. During a seek routine a requested address location is provided and a corresponding seek time and drive current is calculated to drive the voice coil motor and move the heads to the desired location. There are typically two types of seek trajectories utilized to move the heads, bang-bang and sinusoidal. Bang-bang trajectories tend to introduce unwanted vibration in the drive. Sinusoidal trajectories introduce less vibration but typically require longer seek times. It would be desirable to provide a seek trajectory that minimized seek times and unwanted vibration.

BRIEF SUMMARY OF THE INVENTION

A hard disk drive that contains a servo that controls a voice coil motor. The servo provides a driving current to the voice coil motor that has multiple sinusoidal waveforms.

DETAILED DESCRIPTION

Described is a hard disk drive that includes a voice coil motor controlled by a servo. The servo provides a driving current that has multiple sinusoidal waveforms. The multi-sinusoidal waveforms minimize seek time and vibrations in the drive.

Figure 2:
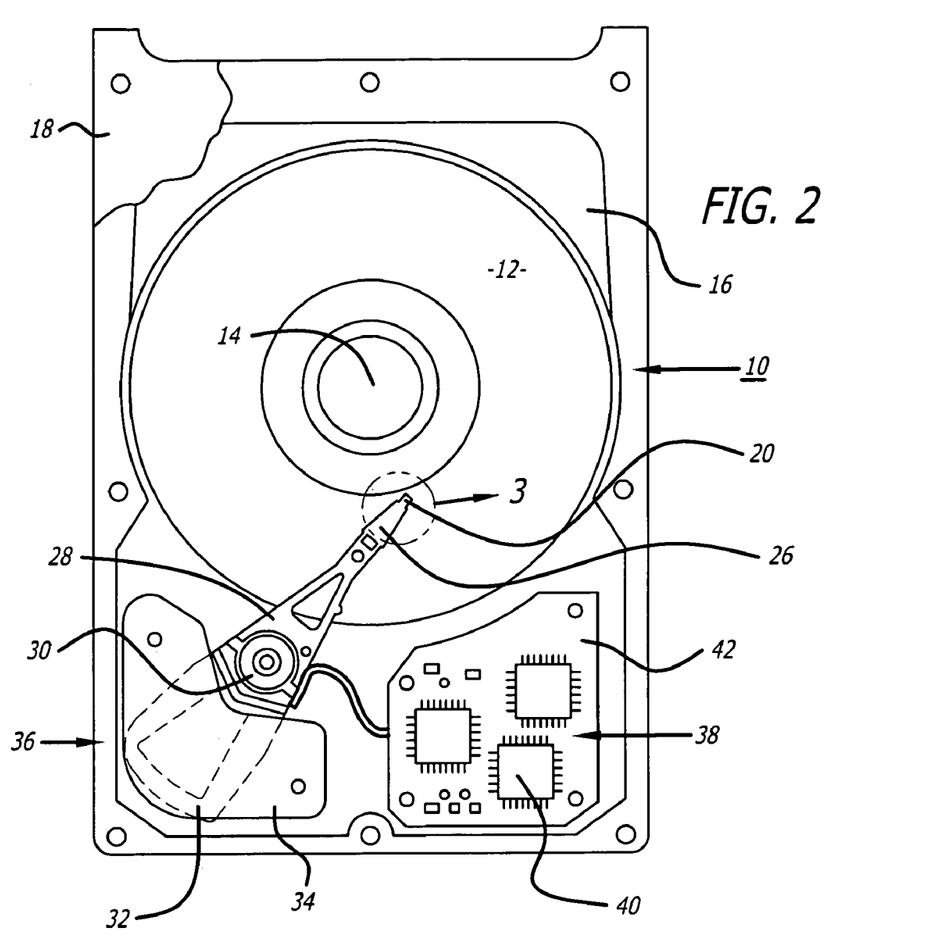
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
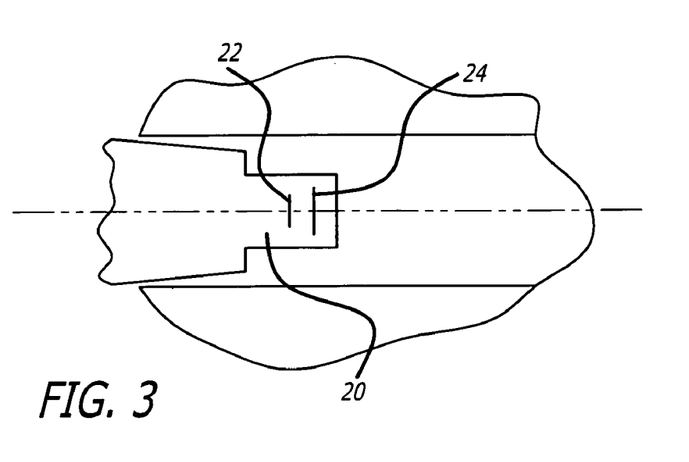
FIG. 3 is a top enlarged view of a head of the hard disk drive.

The disk drive 10 may include a plurality of heads 20 located adjacent to the disks 12. As shown in FIG. 3 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 4:
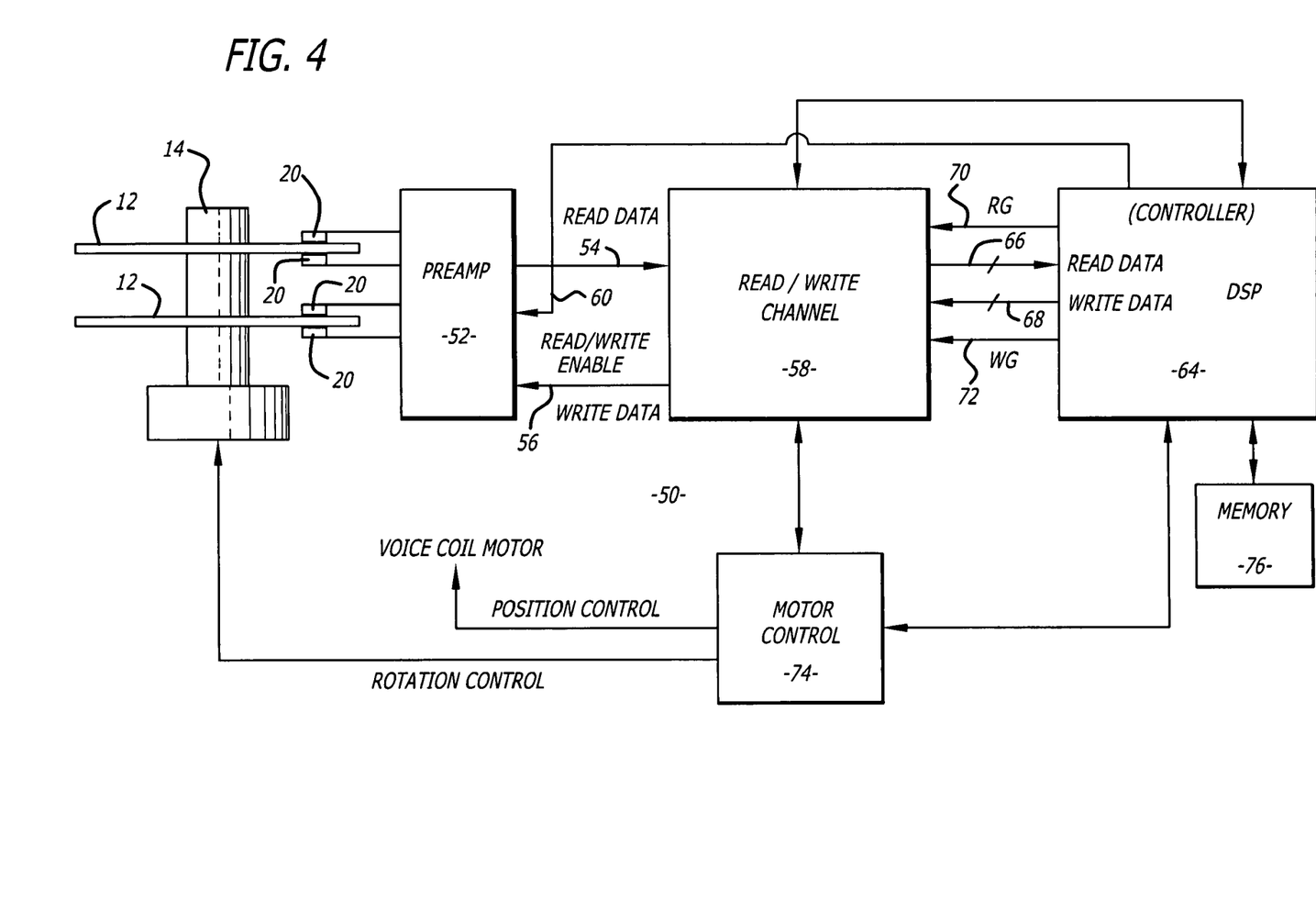
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14. The controller 64 may be connected to a non-volatile memory device 76. By way of example, the device 76 may be a read only memory ("ROM") that contains instructions that are read by the controller 64.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 5:
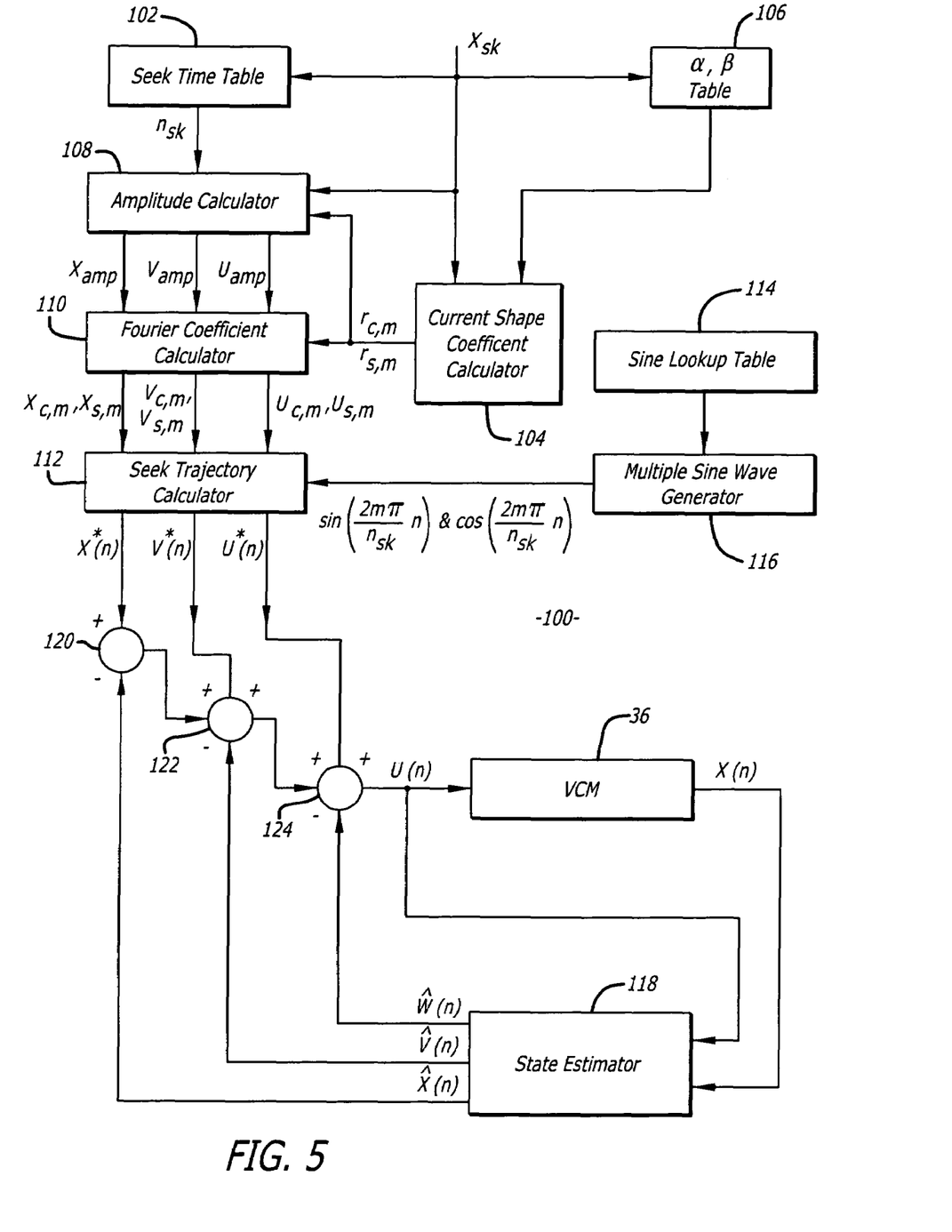
FIG. 5 is a schematic of a servo for the hard disk drive.

FIG. 5 shows a schematic of a servo 100 used to perform a seek operation. The servo is typically performed by the controller 64. In a seek operation the heads are moved from one track location to another track location. The seek distance $x_{sk}$ can be provided to a Seek Time Table 102 that provides a seek time $n_{sk}$ from a predefined table. A Current Shape Coefficient Calculator 104 computes Fourier coefficients $r_{c,m}$ and $r_{s,m}$ from the seek distance $x_{sk}$ and curve fitting parameters £ and β. The curve fitting parameters vary for each seek distance and are provided by a curve fitting table 106. An Amplitude Detector 108 calculates position $x_{amp}$, velocity $v_{amp}$ and current $u_{amp}$ amplitudes from the seek time $t_{sk}$, the seek length $x_{sk}$ and the Fourier coefficients $r_{c,m}$ and $r_{s,m}$.

A Fourier Coefficient Calculator 110 then calculates position Fourier coefficients $x_{c,m}$ and $x_{s,m}$, velocity Fourier coefficients $v_{c,m}$ and $v_{s,m}$, and current Fourier coefficients $u_{c,m}$ and $u_{s,m}$. The Fourier coefficients are provided to a Seek Trajectory Calculator 112.

The servo 100 includes a Sine Lookup Table 114 and Sinusoidal Wave Generator 116 that generate multiple sinusoidal waveforms. The Seek Trajectory Calculator 112 outputs position x*(t), velocity v*(t) and current u*(t) trajectories using the Fourier coefficients and multi-sinusoidal waveforms.

Neglecting high-frequency flexible modes, we can express the dynamic model of a voice coil motor actuator as:

$$\ddot{x} = \dot{v} = K_a u \quad (1)$$

Here, $K_a$ is VCM actuator acceleration constant. The variables x, v, u are position, velocity, and current of VCM, respectively. The VCM current dynamics are decribed by:

$$z = L\dot{u} + Ru + K_e v \quad (2)$$

The constants L, R, and $K_e$ represent VCM coil inductance, VCM coil resistance, and back EMF constant, respectively. The variable z is VCM coil voltage. An embodiment of a seek projectory of the present invention is derived as follows:

The VCM current can be provided in the form of a finite Fourier series with unknown Fourier coefficients.

$$u^*(t) = \sum_{m=1}^{M} u_{c,m} \cos\left(\frac{2m\pi}{t_{sk}} t\right) + \sum_{m=1}^{M} u_{s,m} \sin\left(\frac{2m\pi}{t_{sk}} t\right) \quad (3)$$

where $t_{sk}$ is seek time and M is the number of harmonics. The unknown cosine coefficients $u_{c,m}$, m=1,2, . . . ,M and sine coefficients $u_{s,m}$, m=1,2, . . . ,M will be determined such that seek time is minimized. Integrating current trajectory in equation (3) over time successively provides the following velocity and position trajectories:

$$v^*(t) = \int_0^t K_a u^*(\tau) d\tau \quad (4)$$
$$= \sum_{m=1}^{M} \frac{K_a t_{sk}}{2m\pi} u_{s,m} \left[1 - \cos\left(\frac{2m\pi}{t_{sk}} t\right)\right] +$$
$$\sum_{m=1}^{M} \frac{K_a t_{sk}}{2m\pi} u_{c,m} \sin\left(\frac{2m\pi}{t_{sk}} t\right)$$

$$x^*(t) = \int_0^t v^*(\tau) d\tau \quad (5)$$
$$= \sum_{m=1}^{M} \frac{K_a t_{sk}}{2m\pi} u_{s,m} t + \sum_{m=1}^{M} \frac{K_a t_{sk}^2}{(2m\pi)^2} I_{c,m} \left[1 - \cos\left(\frac{2m\pi}{t_{sk}} t\right)\right] -$$
$$\sum_{m=1}^{M} \frac{K_a t_{sk}^2}{(2m\pi)^2} I_{s,m} \sin\left(\frac{2m\pi}{t_{sk}} t\right)$$

Using the position trajectory, it can be seen that seek time $t_{sk}$ for seek length $x_{sk}$ is:

$$t_{sk}^2 = \frac{2\pi x_{sk}}{K_a \sum_{m=1}^{M} \frac{u_{s,m}}{m}} \quad (6)$$

There are practical constraints imposed on VCM current. First, VCM voltage is limited to the finite power supply voltage $V_s$. Substituting equations (3) and (4) into equation (2), the first constraint on VCM current can be expressed as:

$$\max_{0 \le t \le t_{sk}} |z(t)| = \max_{0 \le t \le t_{sk}} \left| \sum_{m=1}^{M} \frac{K_e K_a t_{sk}}{2m\pi} u_{s,m} + \right. \quad (7)$$
$$\sum_{m=1}^{M} \left(-\frac{L2m\pi}{t_{sk}} u_{c,m} + \frac{K_e K_a t_{sk}}{2m\pi} u_{c,m} + R u_{s,m}\right) \sin\left(\frac{2m\pi}{t_{sk}} t\right) +$$
$$\left. \sum_{m=1}^{M} \left(\frac{L2m\pi}{t_{sk}} u_{s,m} - \frac{K_e K_a t_{sk}}{2m\pi} u_{s,m} + R u_{c,m}\right) \cos\left(\frac{2m\pi}{t_{sk}} t\right) \right| \le V_s$$

Another constraint is that VCM current should be zero at the start and finish time of seek for its continuity.

$$u^*(0) = u^*(t_{sk}) = \sum_{m=1}^{M} u_{c,m} = 0 \quad (8)$$

The optimization can be achieved by finding the unknown coefficients $u_{c,m}, u_{s,m}$ such that the seek time equation (6) is minimized under two constraints defined by equations (7) and (8). The optimization problem can be described as:

Minimize f(x)

subject to $c_1(x) \le 0$ and $c_2(x) = 0$ (9)

Here, vector x and functions f(x), $c_1(x)$, $c_2(x)$ are defined by:

$$x = [u_{s,1} \; u_{s,2} \ldots u_{s,M} \; u_{c,1} \; u_{c,2} \ldots u_{c,M}] \quad (10)$$

$$c_1(x) = \max_{0 \le t \le t_{sk}} \left| \sum_{m=1}^{M} \frac{K_e K_a t_{sk}}{2m\pi} u_{s,m} + \right. \quad (12)$$
$$\sum_{m=1}^{M} \left(-\frac{L2m\pi}{t_{sk}} u_{c,m} + \frac{K_e K_a t_{sk}}{2m\pi} u_{c,m} + R u_{s,m}\right) \sin\left(\frac{2m\pi}{t_{sk}} t\right) +$$
$$\left. \sum_{m=1}^{M} \left(\frac{L2m\pi}{t_{sk}} u_{s,m} - \frac{K_e K_a t_{sk}}{2m\pi} u_{s,m} + R u_{c,m}\right) \cos\left(\frac{2m\pi}{t_{sk}} t\right) \right| - V_s$$

$$c_2(x) = \sum_{m=1}^{M} u_{c,m} \quad (13)$$

This is a constrained nonlinear optimization problem. It is almost impossible to find the closed-form solution to the optimization problem. The Matlab command FMINCON (FMIN,X0,NONCON) is quite well suited to the numerical solution of the constrained optimization problem. Here, FMIN, X0, and NONCON are used for setting objective function, initial solution, and nonlinear constraints, respectively. The optimization problem is solved to find the current Fourier coefficients $u_{c,m}, u_{s,m}$ for each seek length $x_{sk}$.

Optimization of the seek trajectory can be found in the following manner. The seek time $t_{sk}$ in equation (6) is calculated from the solution $u_{c,m}, u_{x,m}$ at each seek length. The seek time is divided by sampling period $T_s$ to be converted to discrete seek time $n_{sk}=t_{sk}/T_s$. The discrete seek time is saved in Seek Time Table 102. The current amplitude is defined as the first sine Fourier coefficient $u_{amp}=u_{s,1}$ and each Fourier coefficient is normalized by the current amplitude.

$$r_{s,m} = \frac{u_{s,m}}{u_{s,1}}, \quad r_{c,m} = \frac{u_{c,m}}{u_{s,1}}, \quad m = 1, 2, \ldots, M \tag{14}$$

The relative coefficients determine the shape of the seek trajectory and are different for each seek length. The first order curve fitting is used to approximate the variation of relative coefficients with seek length.

$$r_{s,m}=\alpha_{s,m}x_{sk}+\beta_{s,m}, \quad r_{c,m}=\alpha_{c,m}x_{sk}+\beta_{c,m}, \quad m=1, 2, \ldots, M \tag{15}$$

Here, $\alpha_{s,m}, \beta_{s,m}, \alpha_{c,m}, \beta_{c,m}, m=1, 2, \ldots, M$ denote curve fitting parameters. They are determined at each seek length and saved in table 106. The Current Shape Coefficient Calculator 104 computes the relative coefficients with the parameters $\alpha_{s,m}, \beta_{s,m}, \alpha_{c,m}, \beta_{c,m}$ provided by the Table 106 and using equation (15).

A discrete version of equation (14) can be written as:

$$u^*(n) = \sum_{m=1}^{M} u_{amp} r_{c,m} \cos\left(\frac{2m\pi}{n_{sk}} n\right) + \sum_{m=1}^{M} u_{amp} r_{s,m} \sin\left(\frac{2m\pi}{n_{sk}} n\right) \tag{16}$$

$$v^*(n) = \sum_{m=1}^{M} \frac{K_a T_s n_{sk} u_{amp}}{2\pi} \frac{r_{s,m}}{m}\left[1 - \cos\left(\frac{2m\pi}{n_{sk}} n\right)\right] +$$

$$\sum_{m=1}^{M} \frac{K_a T_s n_{sk} u_{amp}}{2\pi} \frac{r_{c,m}}{m} \sin\left(\frac{2m\pi}{n_{sk}} n\right)$$

$$x^*(n) = \frac{x_{sk}}{n_{sk}} n + \sum_{m=1}^{M} \frac{K_a T_s^2 n_{sk}^2 u_{amp}}{(2\pi)^2} \frac{r_{c,m}}{m^2}\left[1 - \cos\left(\frac{2m\pi}{n_{sk}} n\right)\right] -$$

$$\sum_{m=1}^{M} \frac{K_a T_s^2 n_{sk}^2 u_{amp}}{(2\pi)^2} \frac{r_{s,m}}{m^2} \sin\left(\frac{2m\pi}{n_{sk}} n\right)$$

Here, k is discrete time. If some seek length $x_{sk}$ is specified, the corresponding seek time $n_{sk}$ is determined by reading Seek Time Table 102. The Current Shape Coefficient Calculator 104 reads curve fitting parameters $\alpha_{s,m}, \beta_{s,m}, \alpha_{c,m}, \beta_{c,m}$ from $\alpha, \beta$ table 106 and computes relative Fourier coefficients $r_{c,m}, r_{s,m}$ using equations (15). The Amplitude Calculator 108 determines current amplitude, velocity amplitude, and position amplitude from seek length, seek time, and relative Fourier coefficents. Combining equations (6) and (14), the current amplitude $u_{amp}$ can be computed from the following equation:

$$u_{amp} = \frac{2\pi x_{sk}}{K_a T_s^2 n_{sk}^2 \sum_{m=1}^{M} \frac{r_{s,m}}{m}} \tag{17}$$

Velocity amplitude $v_{amp}$ and position amplitude $x_{amp}$ can be computed with the following equations:

$$v_{amp} = \frac{K_a T_s}{2\pi} n_{sk} u_{amp}, \quad x_{amp} = \frac{K_a T_s^2}{(2\pi)^2} n_{sk}^2 u_{amp} \tag{18}$$

Fourier Coefficient Calculator 110 determines Fourier coefficients from relative Fourier coefficients and amplitudes using the following equations:

$$u_{c,m} = u_{amp} r_{c,m}, \quad u_{s,m} = u_{amp} r_{s,m}, \quad m = 1, 2, \ldots, M \tag{19}$$

$$v_{c,m} = v_{amp} \frac{r_{s,m}}{m}, \quad v_{s,m} = v_{amp} \frac{r_{c,m}}{m}, \quad m = 1, 2, \ldots, M$$

$$x_{c,m} = x_{amp} \frac{r_{c,m}}{m^2}, \quad x_{s,m} = x_{amp} \frac{r_{s,m}}{m^2}, \quad m = 1, 2, \ldots, M$$

The coefficient of position ramp signal is computed as:

$$x_0 = \frac{x_{sk}}{n_{sk}} \tag{20}$$

Sinusoidal signal generator 116 generates two fundamental signals $\cos(2\pi n/n_{sk})$ and $\sin(2\pi n/n_{sk})$ by reading Sine Lookup Table 104. The harmonic signals can be generated from a fundamental signal by using the following recursive equation:

$$\begin{bmatrix} \cos\left(\frac{2m\pi}{n_{sk}} n\right) \\ \sin\left(\frac{2m\pi}{n_{sk}} n\right) \end{bmatrix} = \begin{bmatrix} \cos\left(\frac{2\pi}{n_{sk}} n\right) & -\sin\left(\frac{2\pi}{n_{sk}} n\right) \\ \sin\left(\frac{2\pi}{n_{sk}} n\right) & \cos\left(\frac{2\pi}{n_{sk}} n\right) \end{bmatrix} \begin{bmatrix} \cos\left(\frac{2(m-1)\pi}{n_{sk}} n\right) \\ \sin\left(\frac{2(m-1)\pi}{n_{sk}} n\right) \end{bmatrix}, \tag{21}$$

$$m = 2, 3, \ldots, M$$

The Trajectory Calculator 112 generates current trajectory, velocity trajectory, and position trajectory by multiplying sinusoidal signals and Fourier coefficients in accordance with the following equations:

$$u^*(n) = \sum_{m=1}^{M} u_{c,m} \cos\left(\frac{2m\pi}{n_{sk}} n\right) + \sum_{m=1}^{M} u_{s,m} \sin\left(\frac{2m\pi}{n_{sk}} n\right) \tag{22}$$

$$v^*(n) = \sum_{m=1}^{M} v_{c,m}\left[1 - \cos\left(\frac{2m\pi}{n_{sk}} n\right)\right] + \sum_{m=1}^{M} v_{s,m} \sin\left(\frac{2m\pi}{n_{sk}} n\right)$$

$$x^*(n) = x_0 n + \sum_{m=1}^{M} x_{c,m}\left[1 - \cos\left(\frac{2m\pi}{n_{sk}} n\right)\right] - \sum_{m=1}^{M} x_{s,m} \sin\left(\frac{2m\pi}{n_{sk}} n\right)$$

An embodiment of a seek trajectory in the case of coast mode seek is derived as follows. Coast mode is between acceleration mode and deceleration mode. Coast mode is where VCM is kept at allowable maximum speed. $v_{max}, x_{max}$, and Δx denote maximum velocity, minimum seek seek length to reach maximum velocity, and increment of position per servo sample at maximum velocity, respectively. $n_{accel}$, $n_{decel}$, and $n_{accel\_decel}$ are acceleration time, deceleration time, and their sum at seek length $x_{max}$, respectively. If seek length $x_{sk}$ is larger than $x_{max}$, the coast mode. Then, coast mode time $n_{coast}$ is calculated as:

$$n_{coast} = \frac{x_{sk} - x_{max}}{v_{max}} \qquad (23)$$

and seek time $n_{sk}$ is:

$$n_{sk} = n_{accel\_decel} + n_{coast} = n_{accel} + n_{decel} + n_{coast} \qquad (24)$$

Travel length during coast mode $x_{coast}$ and the remaining travel length $x_{accel\_decel}$ can be computed as:

$$x_{coast} = n_{coast} \Delta c \qquad (25)$$

$$x_{xaccel\_decel} = x_{sk} - x_{coast} \qquad (26)$$

Using equations (17) and (18), current amplitude, velocity amplitude, and position amplitude can be computed with the following equations:

$$u_{amp,max} = \frac{2\pi x_{accel\_decel}}{K_a T_s^2 n_{accel\_decel}^2 \sum_{m=1}^{M} \frac{r_{s,m,max}}{m}} \qquad (27)$$

$$v_{amp,max} = \frac{K_a T_s}{2\pi} n_{accel\_decel} u_{amp,max}$$

$$x_{amp,max} = \frac{K_a T_s^2}{(2\pi)^2} n_{accel\_decel}^2 u_{amp,max}$$

where $r_{c,m,max}$, $r_{s,m,max}$ are relative Fourier coefficients of current trajectory for seek length $x_{max}$. From equation (19), the Fourier coefficients can be computed for each trajectory as follows:

$$u_{c,m} = u_{amp,max} r_{c,m,max}, \quad u_{s,m} = u_{amp,max} r_{s,m,max}, \qquad (28)$$

$$m = 1, 2, \ldots, M$$

$$v_{c,m} = v_{amp,max} \frac{r_{s,m,max}}{m}, \quad v_{s,m} = v_{amp,max} \frac{r_{c,m,max}}{m},$$

$$m = 1, 2, \ldots, M$$

$$x_{c,m} = x_{amp,max} \frac{r_{c,m,max}}{m^2}, \quad x_{s,m} = x_{amp,max} \frac{r_{s,m,max}}{m^2},$$

$$m = 1, 2, \ldots, M$$

The final seek trajectories can be written as:

$$u^*(n) = \begin{cases} \sum_{m=1}^{M} u_{c,m} \cos\left(\frac{2m\pi}{n_{accel\_decel}} n\right) + \\ \sum_{m=1}^{M} u_{s,m} \sin\left(\frac{2m\pi}{n_{accel\_decel}} n\right) & \text{if } 0 \leq n \leq n_{accel} \\ u_{coast} & \text{if } n_{accel} < n \leq n_{accel} + n_{coast} \\ \sum_{m=1}^{M} u_{c,m} \cos\left(\frac{2m\pi}{n_{accel\_decel}} (n - n_{coast})\right) + \\ \sum_{m=1}^{M} u_{s,m} \sin\left(\frac{2m\pi}{n_{accel\_decel}} (n - n_{coast})\right) & \text{if } n_{accel} + n_{coast} < n \leq n_{sk} \end{cases} \qquad (29)$$

where $u_{coast} = \sum_{m=1}^{M} u_{c,m} \cos\left(\frac{2m\pi}{n_{accel\_decel}} n_{accel}\right) + \sum_{m=1}^{M} u_{s,m} \sin\left(\frac{2m\pi}{n_{accel\_decel}} n_{accel}\right)$ $$v^*(n) = \begin{cases} \sum_{m=1}^{M} v_{c,m} \left[1 - \cos\left(\frac{2m\pi}{n_{accel\_decel}} n\right)\right] + \\ \sum_{m=1}^{M} v_{s,m} \sin\left(\frac{2m\pi}{n_{accel\_decel}} n\right) & \text{if } 0 \leq n \leq n_{accel} \\ v_{coast} & \text{if } n_{accel} < n \leq n_{accel} + n_{coast} \\ \sum_{m=1}^{M} v_{c,m} \left[1 - \cos\left(\frac{2m\pi}{n_{accel\_decel}} (n - n_{coast})\right)\right] + \\ \sum_{m=1}^{M} v_{s,m} \sin\left(\frac{2m\pi}{n_{accel\_decel}} (n - n_{coast})\right) & \text{if } n_{accel} + n_{coast} < n \leq n_{sk} \end{cases} \qquad (30)$$

where $v_{coast} = \sum_{m=1}^{M} v_{c,m} \left[1 - \cos\left(\frac{2m\pi}{n_{accel\_decel}} n_{accel}\right)\right] + \sum_{m=1}^{M} v_{s,m} \sin\left(\frac{2m\pi}{n_{accel\_decel}} n_{accel}\right)$ -continued $$x^*(n) = \begin{cases} x_0 n + \sum_{m=1}^{M} x_{c,m}\left[1 - \cos\left(\frac{2m\pi}{n_{accel\_decel}}n\right)\right] - \\ \quad \sum_{m=1}^{M} x_{s,m}\sin\left(\frac{2m\pi}{n_{accel\_decel}}n\right) & \text{if } 0 \leq n \leq n_{accel} \\ x_{accel} + \Delta x(n - n_{accel}) & \text{if } n_{accel} < n \leq n_{accel} + n_{coast} \\ x_{coast} + x_0(n - n_{coast}) + \sum_{m=1}^{M} x_{c,m}\left[1 - \cos\left(\frac{2m\pi}{n_{accel\_decel}}(n - n_{coast})\right)\right] - \\ \quad \sum_{m=1}^{M} x_{s,m}\sin\left(\frac{2m\pi}{n_{accel\_decel}}(n - n_{coast})\right) & \text{if } n_{accel} + n_{coast} < n \leq n_{sk} \end{cases} \quad (31)$$

where $x_{accel} = x_0 n_{accel} + \sum_{m=1}^{M} x_{c,m}\left[1 - \cos\left(\frac{2m\pi}{n_{accel\_decel}}n_{accel}\right)\right] - \sum_{m=1}^{M} x_{s,m}\sin\left(\frac{2m\pi}{n_{accel\_decel}}n_{accel}\right)$ $x_0 = \frac{x_{accel\_decel}}{n_{accel\_decel}}$ Position trajectory tracking controller is constructed to make VCM actuator follow the desired position trajectory x*(n).

The current trajectory u(n) is provided to the voice coil motor 36 to move the heads to the desired track. The servo system may include a state estimator 118 for feed forward control of the system. The estimator 118 may provide position $\hat{x}(t)$, velocity $\hat{v}(t)$ and torque $\hat{w}(t)$ estimates to adders 120, 122 and 124.

Figure 6:
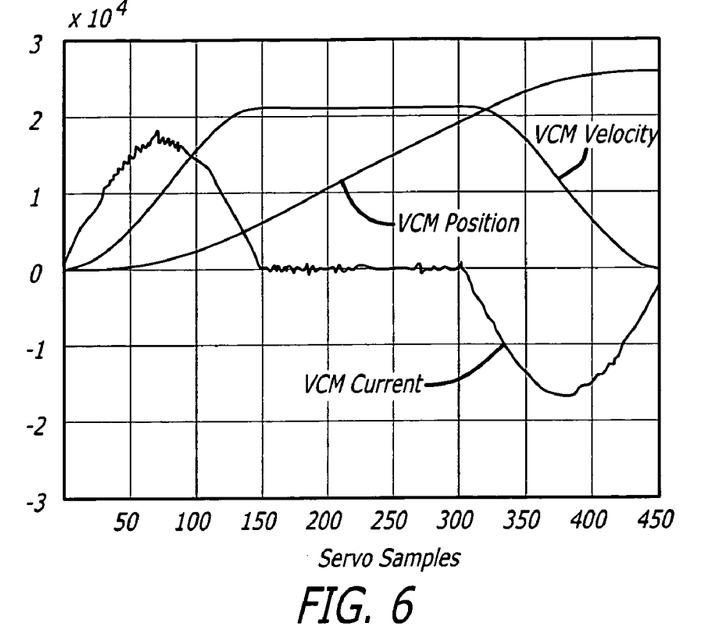
FIG. 6 is a graph showing a seek performance using a single sinusoidal drive current.
Figure 7:
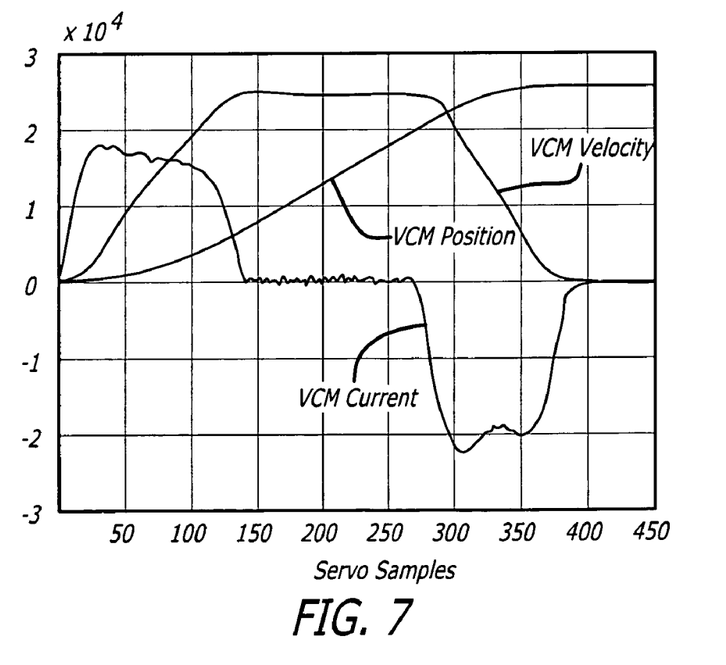
FIG. 7 is a graph showing a seek performance using a multi-sinusoidal drive current.

FIGS. 6 and 7 shows a comparison between a prior art single sinusoidal drive current and a multi-drive current. As can be seen the utilization of a multi-sinusoidal drive current reduces the seek time for a given seek length.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk;
a head coupled to said disk;
an actuator arm coupled to said head;
a voice coil motor actuator coupled to said actuator arm; and,
a servo coupled to said voice coil motor, said servo provides a driving current to said voice coil motor, said driving current being a function of at least one seek trajectory that has multiple sinusoidal components including at least two components that have different frequencies, said servo means includes a feed forward control loop.

2. The hard disk drive of claim 1, wherein said servo includes a seek time table coupled to a current amplitude calculator, a fourier coefficient calculator coupled to said current amplitude calculator, a seek trajectory calculator coupled to said fourier coefficient calculator and a multi-sinusoidal wave generator coupled to said seek trajectory calculator.

3. The hard disk drive of claim 2, wherein said seek trajectory calculator calculates trajectories having a form of:

$$u^*(n) = \sum_{m=1}^{M} u_{amp} r_{c,m} \cos\left(\frac{2m\pi}{n_{sk}}n\right) + \sum_{m=1}^{M} u_{amp} r_{s,m} \sin\left(\frac{2m\pi}{n_{sk}}n\right)$$

$$v^*(n) = \sum_{m=1}^{M} \frac{K_a T_s n_{sk} u_{amp}}{2\pi} \frac{r_{s,m}}{m}\left[1 - \cos\left(\frac{2m\pi}{n_{sk}}n\right)\right] +$$

$$\sum_{m=1}^{M} \frac{K_a T_s n_{sk} u_{amp}}{2\pi} \frac{r_{c,m}}{m} \sin\left(\frac{2m\pi}{n_{sk}}n\right)$$

$$x^*(n) = \frac{x_{sk}}{n_{sk}}n + \sum_{m=1}^{M} \frac{K_a T_s^2 n_{sk}^2 u_{amp}}{(2\pi)^2} \frac{r_{c,m}}{m^2}\left[1 - \cos\left(\frac{2m\pi}{n_{sk}}n\right)\right] -$$

$$\sum_{m=1}^{M} \frac{K_a T_s^2 n_{sk}^2 u_{amp}}{(2\pi)^2} \frac{r_{s,m}}{m^2} \sin\left(\frac{2m\pi}{n_{sk}}n\right).$$

4. The hard disk drive of claim 1, wherein said servo is performed by a controller.

5. A hard disk drive, comprising:
a disk;
a head coupled to said disk;
an actuator arm coupled to said head;
a voice coil motor actuator coupled to said actuator arm; and,
servo means for providing a driving current to said voice coil, said driving current being a function of at least one seek trajectory that has multiple sinusoidal components including at least two components that have different frequencies, said servo means includes a feed forward loop.

6. The hard disk drive of claim 5, wherein said servo means includes a seek time table coupled to a current amplitude calculator, a fourier coefficient calculator coupled to said current amplitude calculator, a seek trajectory calculator coupled to said fourier coefficient calculator and a multi-sinusoidal wave generator coupled to said seek trajectory calculator.

7. The hard disk drive of claim 6, wherein said seek trajectory calculator calculates trajectories having a form of:

$$u^*(n) = \sum_{m=1}^{M} u_{amp} r_{c,m} \cos\left(\frac{2m\pi}{n_{sk}}n\right) + \sum_{m=1}^{M} u_{amp} r_{s,m} \sin\left(\frac{2m\pi}{n_{sk}}n\right)$$

$$v^*(n) = \sum_{m=1}^{M} \frac{K_a T_s n_{sk} u_{amp}}{2\pi} \frac{r_{s,m}}{m}\left[1 - \cos\left(\frac{2m\pi}{n_{sk}}n\right)\right] +$$

$$\sum_{m=1}^{M} \frac{K_a T_s n_{sk} u_{amp}}{2\pi} \frac{r_{c,m}}{m} \sin\left(\frac{2m\pi}{n_{sk}}n\right)$$

$$x^*(n) = \frac{x_{sk}}{n_{sk}}n + \sum_{m=1}^{M} \frac{K_a T_s^2 n_{sk}^2 u_{amp}}{(2\pi)^2} \frac{r_{c,m}}{m^2}\left[1 - \cos\left(\frac{2m\pi}{n_{sk}}n\right)\right] -$$

$$\sum_{m=1}^{M} \frac{K_a T_s^2 n_{sk}^2 u_{amp}}{(2\pi)^2} \frac{r_{s,m}}{m^2} \sin\left(\frac{2m\pi}{n_{sk}}n\right).$$

8. The hard disk drive of claim 5, wherein said servo is performed by a controller.

9. A method for driving a voice coil motor of a hard disk drive, comprising:
providing a driving current that is a function of a feed forward estimate and at least one seek trajectory that has multiple sinusoidal components, to a voice coil motor; and,
moving the voice coil motor relative to a magnetic disk including at least two components that have different frequencies.

10. The method of claim 9, further comprising requesting a seek, providing a seek time in response to the seek request, calculating a current amplitude from the seek time, calculating a plurality of fourier coefficients from the current amplitude and calculating the driving current from the fourier coefficients.

11. The method of claim 9, further comprising calculating trajectories having a form of:

$$u^*(n) = \sum_{m=1}^{M} u_{amp} r_{c,m} \cos\left(\frac{2m\pi}{n_{sk}}n\right) + \sum_{m=1}^{M} u_{amp} r_{s,m} \sin\left(\frac{2m\pi}{n_{sk}}n\right)$$

$$v^*(n) = \sum_{m=1}^{M} \frac{K_a T_s n_{sk} u_{amp}}{2\pi} \frac{r_{s,m}}{m}\left[1 - \cos\left(\frac{2m\pi}{n_{sk}}n\right)\right] +$$

$$\sum_{m=1}^{M} \frac{K_a T_s n_{sk} u_{amp}}{2\pi} \frac{r_{c,m}}{m} \sin\left(\frac{2m\pi}{n_{sk}}n\right)$$

$$x^*(n) = \frac{x_{sk}}{n_{sk}}n + \sum_{m=1}^{M} \frac{K_a T_s^2 n_{sk}^2 u_{amp}}{(2\pi)^2} \frac{r_{c,m}}{m^2}\left[1 - \cos\left(\frac{2m\pi}{n_{sk}}n\right)\right] -$$

$$\sum_{m=1}^{M} \frac{K_a T_s^2 n_{sk}^2 u_{amp}}{(2\pi)^2} \frac{r_{s,m}}{m^2} \sin\left(\frac{2m\pi}{n_{sk}}n\right).$$

\* \* \* \* \*